United States Patent
Cardei et al.

(10) Patent No.: US 11,269,066 B2
(45) Date of Patent: Mar. 8, 2022

(54) MULTI-SENSOR SYNCHRONIZATION MEASUREMENT DEVICE

(71) Applicant: Waymo LLC, Mountain View, CA (US)

(72) Inventors: Vlad Cardei, Mountain View, CA (US); Lucian Ion, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 173 days.

(21) Appl. No.: 16/386,782

(22) Filed: Apr. 17, 2019

(65) Prior Publication Data
US 2020/0333447 A1 Oct. 22, 2020

(51) Int. Cl.
*G01S 7/497* (2006.01)
*G01S 17/10* (2020.01)
*G01S 17/931* (2020.01)
*G05D 1/02* (2020.01)

(52) U.S. Cl.
CPC .............. *G01S 7/497* (2013.01); *G01S 17/10* (2013.01); *G01S 17/931* (2020.01); *G05D 1/027* (2013.01); *G05D 1/0231* (2013.01); *G05D 1/0257* (2013.01); *G05D 1/0278* (2013.01)

(58) Field of Classification Search
CPC ........................................ G01S 7/497
See application file for complete search history.

(56) References Cited

U.S. PATENT DOCUMENTS

| | | | |
|---|---|---|---|
| 6,614,536 B1 | 9/2003 | Doemens | |
| 2003/0226968 A1 | 12/2003 | Montellese | |
| 2010/0235129 A1 | 9/2010 | Sharma et al. | |
| 2011/0128223 A1* | 6/2011 | Lashina | G06F 3/012 345/158 |
| 2014/0175682 A1* | 6/2014 | Johnson | A01M 1/2044 261/30 |

(Continued)

FOREIGN PATENT DOCUMENTS

CN 207489381 U * 6/2018
WO WO 2014/192347 A1 12/2014

OTHER PUBLICATIONS

International Search Report and Written Opinion of the International Searching Authority prepared by the Korean Intellectual Property Office in International Application No. PCT/US2020/026346 dated Jul. 13, 2020.

*Primary Examiner* — Thanh Luu
(74) *Attorney, Agent, or Firm* — McDonnell Boehnen Hulbert & Berghoff LLP

(57) ABSTRACT

Disclosed are devices and methods that may be used for the calibration of sensors of a vehicle. A calibration system disclosed herein includes a trigger device configured to detect a first sensing event. The calibration system further includes a plurality of sensor targets. Additionally, the calibration system includes a processor configured to reveal the plurality of sensor targets within a given region in response to the first sensing event. The calibration system may be configured to detect light from a LIDAR striking a light sensors. In response to detecting the light from the LIDAR, a plurality of lights, both visible and infrared, may be illuminated to correspond with a position and timing of the LIDAR pulse.

20 Claims, 9 Drawing Sheets

(56) References Cited

U.S. PATENT DOCUMENTS

2016/0255700 A1* 9/2016 Nichols ................ H05B 45/10
                                                  315/216
2019/0034739 A1  1/2019 Stein et al.
2019/0204425 A1* 7/2019 Abari .................... G01S 17/931
2020/0231082 A1* 7/2020 Morran ................ G05D 1/0094

* cited by examiner

MULTI-SENSOR SYNCHRONIZATION MEASUREMENT DEVICE

BACKGROUND

Vehicles can be configured to operate in an autonomous mode in which the vehicle navigates through an environment with little or no input from a driver. Such autonomous vehicles can include one or more systems (e.g., sensors and associated computing devices) that are configured to detect information about the environment in which the vehicle operates. The vehicle and its associated computer-implemented controller use the detected information to navigate through the environment. For example, if the system(s) detect that the vehicle is approaching an obstacle, as determined by the computer-implemented controller, the controller adjusts the vehicle's directional controls to cause the vehicle to navigate around the obstacle.

For example, an autonomous vehicle may include lasers, sonar, radar, cameras, and other sensors which scan and record data from surroundings of the vehicle. Sensor data from one or more of these devices may be used to detect objects and their respective characteristics (position, shape, heading, speed, etc.). This detection and identification is useful for the safe operation of autonomous vehicles.

SUMMARY

Disclosed are devices that may be used to calibrate sensors of a vehicle. A calibration system disclosed herein includes a trigger device configured to detect a first sensing event. The calibration system further includes a plurality of sensor targets. Additionally, the calibration system includes a processor configured to reveal the plurality of sensor targets within a given region in response to the first sensing event.

Some embodiments of the present disclosure provide a method of providing sensor calibration. The method includes detecting a first sensing event by a trigger device. The method also includes revealing a plurality of sensor targets in response to the first sensing event, wherein the plurality of sensor targets are within a given region of a field of view of the respective sensors.

Some embodiments of the present disclosure provide another method for calibrating sensors. The method includes transmitting a sensor signal at a region by a transmitter of a sensor unit, where the region contains a calibration target. The method also includes receiving sensor data from each of a plurality sensors, wherein the sensor data corresponds to the region. Additionally, the method includes determining, by a processor, a respective sensor offset based on the received sensor data. The method further includes operating each sensor by applying the determined respective sensor offset.

These as well as other aspects, advantages, and alternatives, will become apparent to those of ordinary skill in the art by reading the following detailed description, with reference where appropriate to the accompanying drawings.

DETAILED DESCRIPTION

Figure 1:
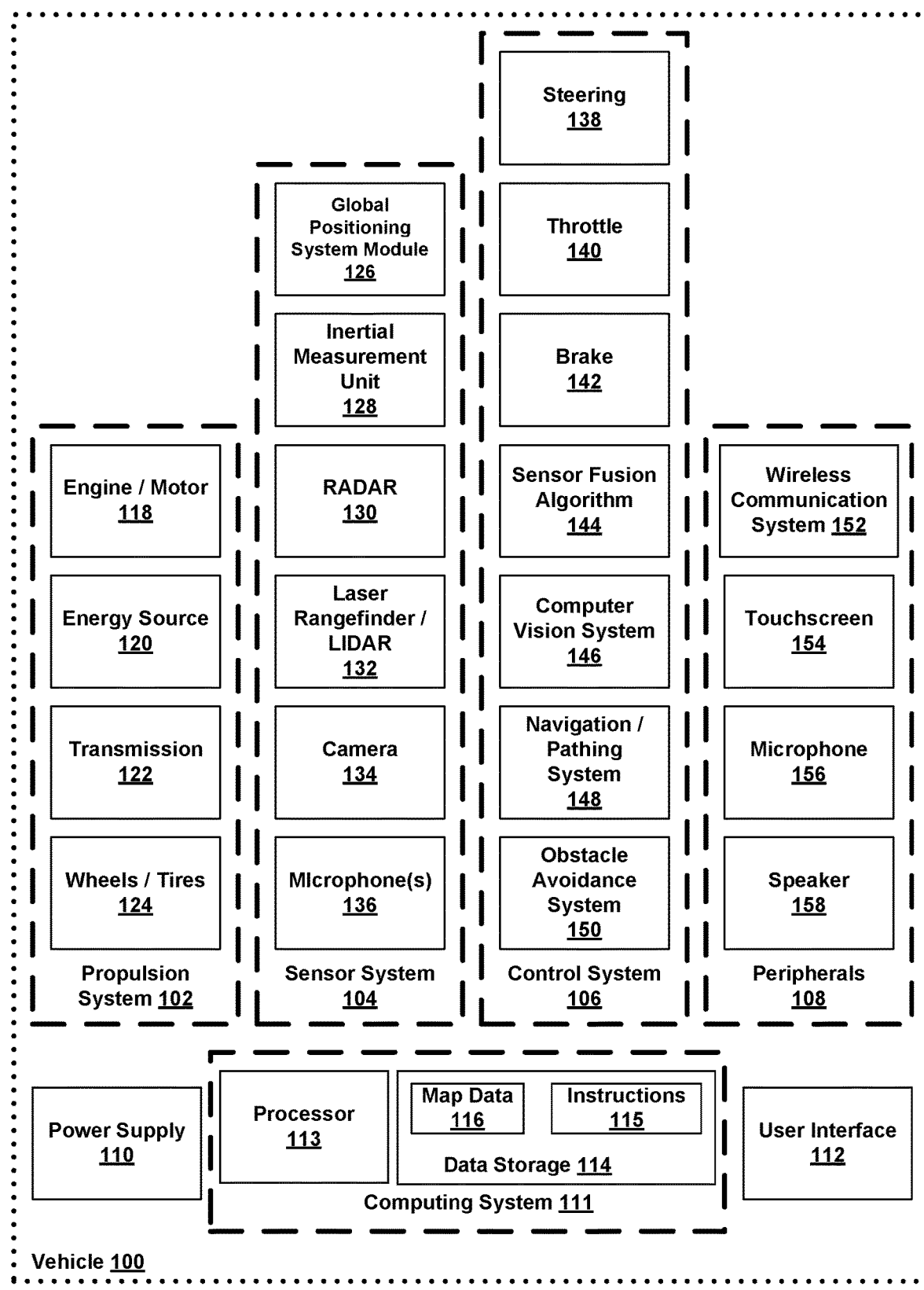
FIG. 1 is a functional block diagram depicting aspects of an example autonomous vehicle.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Machines and machine subsystems, such as sensor systems of a vehicle for instance, may undergo testing and verification to maintain proper performance and adherence to specifications. However, conventional sensor verification processes can be highly manual and costly. For instance, a conventional sensor verification process may involve a skilled technician operating a sensor system to observe specially curated and placed calibration targets in a controlled calibration environment. As a result, conventional processes may be associated with high costs, such as costs for setup and maintenance of a suitable calibration environment for instance. For example, testing a scanning range of a long range sensor may present a challenge due to the physical space needed to test the entire scanning range of the sensor. Additionally, the amount of time involved in testing a large number of sensors repeatedly or periodically (e.g., daily, monthly, etc.) to maintain continued adherence with the specifications may result in substantial costs and delays.

Example systems and methods herein may involve sensor verification, validation, testing, and/or calibration using sensor data from a plurality of vehicles that operate in an environment. Each vehicle of the plurality may include one or more sensors (e.g., LIDARs, RADARs, optical cameras, infrared (IR) cameras, etc.) configured to scan respective portions of the environment surrounding the vehicle. Additionally, in some scenarios, the vehicles may travel within or near a particular region of the environment periodically or intermittently. For instance, multiple vehicles may travel to a particular parking structure, street intersection, or other location on a regular (e.g., daily) basis.

Accordingly, an example system herein may provide a target for multiple sensors of a vehicle. The target system may include a light detector configured to detect when a laser beam (e.g., a near-infrared light detector) of a LIDAR system scans the target. In response to detecting the laser beam, the system may responsively reveal targets for the various sensors of the vehicle. In some examples, the system may reveal one or more of a LIDAR target, a radar target, an optical camera target, and an infrared camera target for an infrared thermal camera. The targets may not be readily visible to the sensors until the laser beam is detected triggering the system to reveal the targets.

The various targets may be provided within a region of the field of view of the various sensors. In some examples, the targets may generally overlap each other to some extent. Once the targets are revealed, the sensors may detect the targets at approximately the same time and in approximately the same location. Thus, the targets may be used to calibrate the sensors for location accuracy, timing accuracy, and synchronization accuracy. In some further examples, the targets may be on a moving platform. In response to detecting the laser beam, the system may responsively reveal and also cause a movement of the targets for the various sensors of the vehicle. Thus, a tracking accuracy may be determined as well.

In some examples, the calibration system may be placed in a location where a vehicle may drive by the target, such as at a vehicle depot. When a vehicle is leaving the depot, the vehicle may be configured to scan the calibration system (which responsively causes the targets to be revealed). The vehicle may be able to scan the various sensor targets that are revealed and determine a calibration for the vehicle's sensors. In some examples, the vehicle may determine various offsets for the sensors, and operate the sensors with the determined offsets (both offsets in time and space) so as to cause the sensors to operate in a synchronized manner. In another example, the vehicle may determine that one or more sensors has a calibration error that is greater than a predetermined threshold. In response to the sensor having a calibration error greater than the threshold, the respective vehicle may not be allowed to operate until the sensor is fixed and/or recalibrated.

II. Example Systems and Devices

Example systems and devices will now be described in greater detail. In general, the embodiments disclosed herein can be used with any system that includes one or more sensors that scan an environment of the system. Illustrative embodiments described herein include vehicles that employ sensors, such as LIDARs, RADARs, SONARs, cameras, etc. However, an example system may also be implemented in or take the form of other devices, such as robotic devices, industrial systems (e.g., assembly lines, etc.), or mobile communication systems or devices, among other possibilities.

The term "vehicle" is broadly construed herein to cover any moving object, including, for instance, an aerial vehicle, watercraft, spacecraft, a car, a truck, a van, a semitrailer truck, a motorcycle, a golf cart, an off-road vehicle, a warehouse transport vehicle, tractor, or a farm vehicle, as well as a carrier that rides on a track such as a roller coaster, trolley, tram, or train car, among other examples. Some vehicles may operate in a fully autonomous mode, where no human interaction is used for operations, a semi-autonomous mode, where no little human interaction is used for operations, or a human-operated mode, where a human operates the vehicle and sensors may aid the human.

In example embodiments, an example vehicle system may include one or more processors, one or more forms of memory, one or more input devices/interfaces, one or more output devices/interfaces, and machine-readable instructions that when executed by the one or more processors cause the system to carry out the various functions, tasks, capabilities, etc., described above. Example systems within the scope of the present disclosure will be described in greater detail below.

FIG. 1 is a functional block diagram illustrating a vehicle 100 according to an example embodiment. The vehicle 100 may be configured to operate fully or partially in an autonomous mode, and thus may be referred to as an "autonomous vehicle." The vehicle may also be configured to be operated by a human, but provide information to the human through the vehicle's sensing systems. For example, a computing system 111 can control the vehicle 100 while in an autonomous mode via control instructions to a control system 106 for the vehicle 100. The computing system 111 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computing system 111, and a user interface 112. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments, the propulsion system 102 includes an engine/motor 118, an energy source 120, a transmission 122, and wheels/tires 124. The engine/motor 118 converts energy source 120 to mechanical energy. In some embodiments, the propulsion system 102 can optionally include one or both of engines and/or motors. For example, a gas-electric hybrid vehicle can include both a gasoline/diesel engine and an electric motor.

The energy source 120 represents a source of energy, such as electrical and/or chemical energy, that may, in full or in part, power the engine/motor 118. That is, the engine/motor 118 can be configured to convert the energy source 120 to mechanical energy to operate the transmission. In some embodiments, the energy source 120 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 120 can also provide energy for other systems of the vehicle 100.

The transmission 122 includes appropriate gears and/or mechanical elements suitable to convey the mechanical power from the engine/motor 118 to the wheels/tires 124. In some embodiments, the transmission 122 includes a gearbox, a clutch, a differential, a drive shaft, and/or axle(s), etc.

The wheels/tires 124 are arranged to stably support the vehicle 100 while providing frictional traction with a surface, such as a road, upon which the vehicle 100 moves. Accordingly, the wheels/tires 124 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 124 of vehicle 100 may be operable to rotate differentially with respect to other wheels/tires 124. The wheels/tires 124 can optionally include at least one wheel that is rigidly attached to the transmission 122 and at least one tire coupled to a rim of a corresponding wheel that makes contact with a driving surface. The wheels/tires 124 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 126, an inertial measurement unit (IMU) 128, a radar unit 130, a laser rangefinder/LIDAR unit 132, a camera 134, and/or a microphone 136. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 126 is a sensor configured to estimate a geographic location of the vehicle 100. To this end, GPS 126 can include a transceiver operable to provide information regarding the position of the vehicle 100 with respect to the Earth.

The IMU 128 can include any combination of sensors (e.g., accelerometers and gyroscopes) configured to sense position and orientation changes of the vehicle 100 based on inertial acceleration.

The radar unit 130 can represent a system that utilizes radio signals to sense objects within the local environment of the vehicle 100. In some embodiments, in addition to sensing the objects, the radar unit 130 and/or the computing system 111 can additionally be configured to sense the speed and/or heading of the objects. The radar unit 130 may include any antenna(s), waveguide networks, communication chip(s), and/or other components that may facilitate radar operation.

Similarly, the laser rangefinder or LIDAR unit 132 can be any sensor configured to sense objects in the environment in which the vehicle 100 is located using lasers. The laser rangefinder/LIDAR unit 132 can include one or more laser sources, a laser scanner, and one or more detectors, among other system components. The laser rangefinder/LIDAR unit 132 can be configured to operate in a coherent (e.g., using heterodyne detection) or an incoherent detection mode.

The camera 134 can include one or more devices configured to capture a plurality of images of the environment surrounding the vehicle 100. The camera 134 can be a still camera or a video camera. In some embodiments, the camera 134 can be mechanically movable such as by rotating and/or tilting a platform to which the camera is mounted. As such, a control process of vehicle 100 may be implemented to control the movement of camera 134.

The sensor system 104 can also include a microphone 136. The microphone 136 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 138, throttle 140, brake unit 142, a sensor fusion algorithm 144, a computer vision system 146, a navigation/pathing system 148, and/or an obstacle avoidance system 150, etc.

The steering unit 138 is operable to adjust the heading of vehicle 100. For example, the steering unit can adjust the axis (or axes) of one or more of the wheels/tires 124 so as to effect turning of the vehicle. The throttle 140 is configured to control, for instance, the operating speed of the engine/motor 118 and, in turn, adjust forward acceleration of the vehicle 100 via the transmission 122 and wheels/tires 124. The brake unit 142 decelerates the vehicle 100. The brake unit 142 can use friction to slow the wheels/tires 124. In some embodiments, the brake unit 142 inductively decelerates the wheels/tires 124 by a regenerative braking process to convert kinetic energy of the wheels/tires 124 to electric current.

The sensor fusion algorithm 144 is an algorithm (or a computer program product storing an algorithm) configured to accept data from the sensor system 104 as an input. The data may include, for example, data representing information sensed at the sensors of the sensor system 104. The sensor fusion algorithm 144 can include, for example, a Kalman filter, Bayesian network, etc. The sensor fusion algorithm 144 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 146 can process and analyze images captured by camera 134 to identify objects and/or features in the environment surrounding vehicle 100. The detected features/objects can include traffic signals, roadway boundaries, other vehicles, pedestrians, and/or obstacles, etc. The computer vision system 146 can optionally employ an object recognition algorithm, a Structure From Motion (SFM) algorithm, video tracking, and/or available computer vision techniques to effect categorization and/or identification of detected features/objects. In some embodiments, the computer vision system 146 can be additionally configured to map the environment, track perceived objects, estimate the speed of objects, etc.

The navigation and pathing system 148 is configured to determine a driving path for the vehicle 100. For example, the navigation and pathing system 148 can determine a series of speeds and directional headings to effect movement of the vehicle along a path that substantially avoids perceived obstacles while generally advancing the vehicle along a roadway-based path leading to an ultimate destination, which can be set according to user inputs via the user interface 112, for example. The navigation and pathing system 148 can additionally be configured to update the driving path dynamically while the vehicle 100 is in operation on the basis of perceived obstacles, traffic patterns, weather/road conditions, etc. In some embodiments, the navigation and pathing system 148 can be configured to incorporate data from the sensor fusion algorithm 144, the GPS 126, and one or more predetermined maps so as to determine the driving path for vehicle 100.

The obstacle avoidance system 150 can represent a control system configured to identify, evaluate, and avoid or otherwise negotiate potential obstacles in the environment surrounding the vehicle 100. For example, the obstacle avoidance system 150 can effect changes in the navigation of the vehicle by operating one or more subsystems in the control system 106 to undertake swerving maneuvers, turning maneuvers, braking maneuvers, etc. In some embodiments, the obstacle avoidance system 150 is configured to automatically determine feasible ("available") obstacle avoidance maneuvers on the basis of surrounding traffic patterns, road conditions, etc. For example, the obstacle avoidance system 150 can be configured such that a swerving maneuver is not undertaken when other sensor systems detect vehicles, construction barriers, other obstacles, etc. in the region adjacent the vehicle that would be swerved into. In some embodiments, the obstacle avoidance system 150 can automatically select the maneuver that is both available and maximizes safety of occupants of the vehicle. For example, the obstacle avoidance system 150 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 152, a touchscreen 154, a microphone 156, and/or a speaker 158.

In some embodiments, the peripherals 108 function to receive inputs for a user of the vehicle 100 to interact with the user interface 112. To this end, the touchscreen 154 can both provide information to a user of vehicle 100, and convey information from the user indicated via the touchscreen 154 to the user interface 112. The touchscreen 154 can be configured to sense both touch positions and touch gestures from a user's finger (or stylus, etc.) via capacitive sensing, resistance sensing, optical sensing, a surface acoustic wave process, etc. The touchscreen 154 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 156 can be configured to receive audio (e.g., a voice command or other audio input) from a user of the vehicle 100. Similarly, the speakers 158 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 152 can wirelessly communicate with one or more devices directly or via a communication network. The wireless communication system 152 can optionally use 3G cellular communication, such as CDMA, EVDO, GSM/GPRS, and/or 4G cellular communication, such as WiMAX or LTE. Additionally or alternatively, wireless communication system 152 can communicate with a wireless local area network (WLAN), for example, using WiFi. In some embodiments, wireless communication system 152 could communicate directly with a device, for example, using an infrared link, Bluetooth, and/or ZigBee. The wireless communication system 152 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 152 within the context of the present disclosure.

As noted above, the power supply 110 can provide power to components of vehicle 100, such as electronics in the peripherals 108, computing system 111, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 120 can be implemented together, as in some all-electric cars.

Many or all of the functions of vehicle 100 can be controlled via computing system 111 that receives inputs from the sensor system 104, peripherals 108, etc., and communicates appropriate control signals to the propulsion system 102, control system 106, peripherals, etc. to effect automatic operation of the vehicle 100 based on its surroundings. computing system 111 includes at least one processor 113 (which can include at least one microprocessor) that executes instructions 115 stored in a non-transitory computer readable medium, such as the data storage 114. The computing system 111 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information as map data 116. Such information may be used by vehicle 100 and computing system 111 during operation of the vehicle 100 in the autonomous, semi-autonomous, and/or manual modes to select available roadways to an ultimate destination, interpret information from the sensor system 104, etc.

The vehicle 100, and associated computing system 111, provides information to and/or receives input from, a user of vehicle 100, such as an occupant in a passenger cabin of the vehicle 100. The user interface 112 can accordingly include one or more input/output devices within the set of peripherals 108, such as the wireless communication system 152, the touchscreen 154, the microphone 156, and/or the speaker 158 to allow communication between the computing system 111 and a vehicle occupant.

The computing system 111 controls the operation of the vehicle 100 based on inputs received from various subsystems indicating vehicle and/or environmental conditions (e.g., propulsion system 102, sensor system 104, and/or control system 106), as well as inputs from the user interface 112, indicating user preferences. For example, the computing system 111 can utilize input from the control system 106 to control the steering unit 138 to avoid an obstacle detected by the sensor system 104 and the obstacle avoidance system 150. The computing system 111 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 134 can capture a plurality of images that represent information about an environment of the vehicle 100 while operating in an autonomous mode. The environment may include other vehicles, traffic lights, traffic signs, road markers, pedestrians, etc. The computer vision system 146 can categorize and/or recognize various aspects in the environment in concert with the sensor fusion algorithm 144, the computing system 111, etc. based on object recognition models pre-stored in data storage 114, and/or by other techniques.

Although the vehicle 100 is described and shown in FIG. 1 as having various components of vehicle 100, e.g., wireless communication system 152, computing system 111, data storage 114, and user interface 112, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
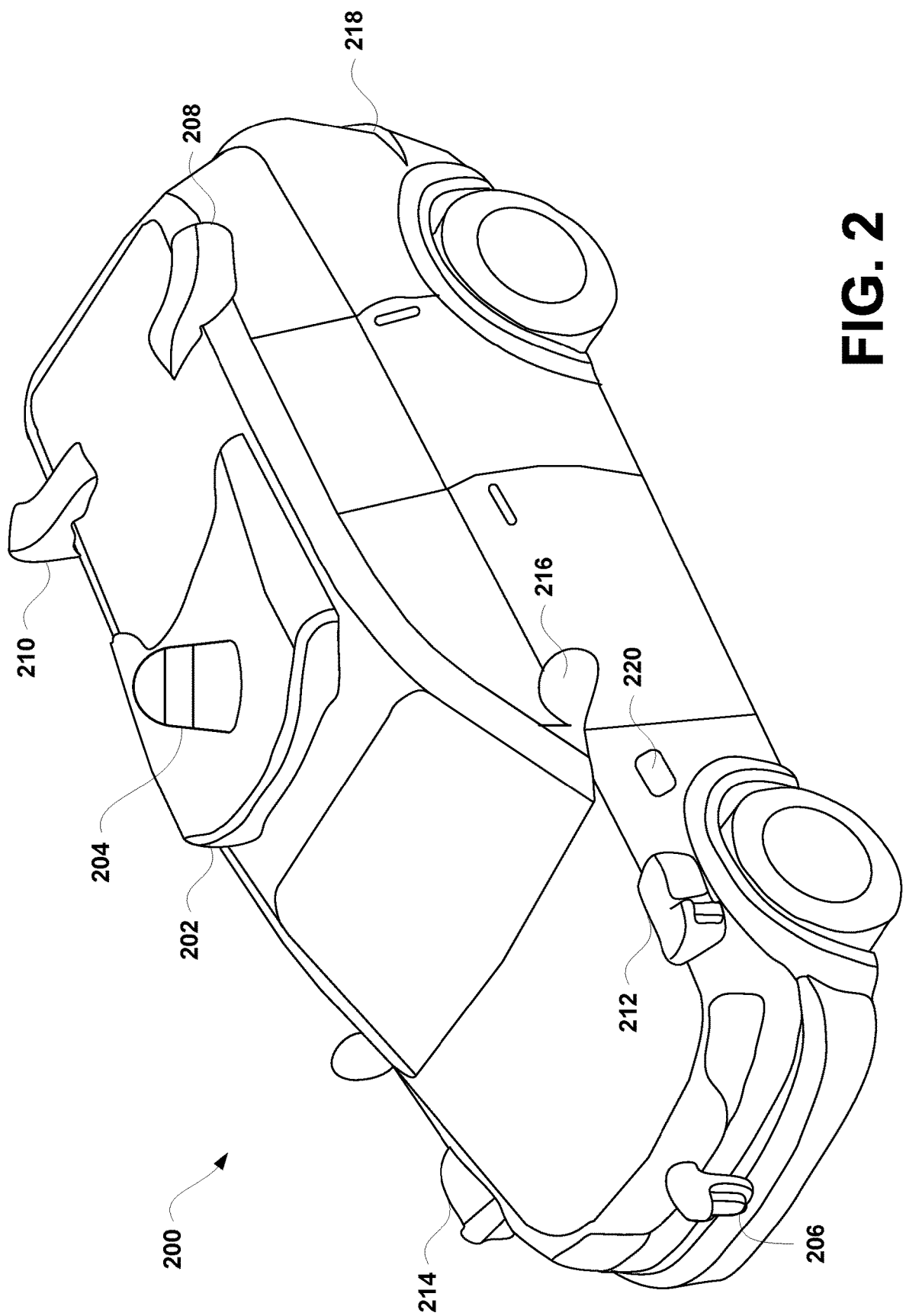
FIG. 2 depicts an exterior view of an example autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, a third radar unit 220, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both. Additionally, another radar unit may be included on the opposite side of the vehicle from radar unit 220.

Furthermore, the example vehicle 200 can include any of the components described in connection with vehicle 100 of FIG. 1. The first, second, and third radar units 208, 210, 220 and/or the first and second LIDAR units 204, 206 can actively scan the surrounding environment for the presence of potential obstacles and can be similar to the radar unit 130 and/or laser rangefinder/LIDAR unit 132 in the vehicle 100. Additionally, the first LIDAR/radar unit 212 and second LIDAR/radar unit 214 can actively scan the surrounding environment for the presence of potential obstacles and can be similar to the radar unit 130 and/or laser rangefinder/LIDAR unit 132 in the vehicle 100.

In some examples, the LIDAR units may be one of two different types of LIDAR unit. A first type of LIDAR unit may be a LIDAR that rotates and can continuously scan the full region of the LIDAR unit's field of view. A second type of LIDAR unit may be a LIDAR that can rotate and be steered to scan a specific region of the LIDAR unit's field of view. The first type of LIDAR unit may have a shorter range than the second type of LIDAR unit. The second type of LIDAR unit may have a smaller field of view when operating compared to the first LIDAR unit. In some examples, one or more of the designated LIDAR units of vehicle 200 may contain one or both types of LIDAR unit. For example, LIDAR unit 204 mounted on the top of the vehicle may contain both types of LIDAR units. In one example, the second type of LIDAR unit may have a field of view in operation that is 8-degrees wide in the horizontal plane and 15-degrees wide in the vertical plane.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, although other mounting locations are possible. Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the region in back of the car 200 for the presence of radio-reflective objects. Similarly, the first LIDAR/radar unit 212 and the second LIDAR/radar unit 214 may be mounted near the front of the vehicle to actively scan a region in front of the vehicle. A radar scanner can be situated, for example, in a location suitable to illuminate a region including a forward-moving path of the vehicle 200 without occlusion by other features of the vehicle 200. For example, a radar scanner can be situated to be embedded and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

In practice, each radar unit may be able to scan over a 90-degree beamwidth. When radar units are placed at the corners of the vehicle, as shown by radar units 208, 210, 212, and 214, each radar unit may be able to scan a 90-degree field of view in the horizontal plane and provide the vehicle with a radar field of view of the full 360-degree area around the vehicle. Further, the vehicle may also include two side-facing radar units, one shown as radar unit 220 (and the second not shown on the opposite side of the vehicle from radar unit 220). The side-facing radar units may be able to provide further radar imaging when other radar units are obstructed, such as when making a protected right hand turn (i.e., a right-hand turn when there's another vehicle in the lane to the left of the turning vehicle).

Although not shown in FIG. 2, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include dedicated short-range communications (DSRC), radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. In one particular example, the sensor unit 202 may contain both optical cameras (i.e., cameras that capture human-visible light) and infrared cameras. Infrared cameras may be able to capture images of heat within the camera's field of view.

The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Further, the camera sensor may be configured with a rolling shutter. A rolling shutter generally will iteratively sample the light sensor to capture image data. The data from the camera sensor may form an image, a plurality of images, or a video. For example, in a traditional image sensor, a rolling shutter may iteratively sample the light sensor one row of cells at a time. When sampling a camera sensor that has a rolling shutter, objects in the field of view of the sensor that have a high speed may appear distorted. Such distortions are caused by the iterative sampling. Because lines of cells are sampled iteratively, the object being imaged moves slightly between each sampling. Therefore, each line will be sampled a slightly later time than the previous line. Due to the delay in sampling respective lines an object having horizontal motion may have a horizontal skew. For example, a vehicle moving across the field of view of the sensor may have a horizontal skew and vertical compression (or expansion) that distorts the vehicle. This skew may be troublesome for processing based on the horizontal location of objects in an image. The present system may help identify possible camera distortions caused by a rolling shutter.

Figure 3:
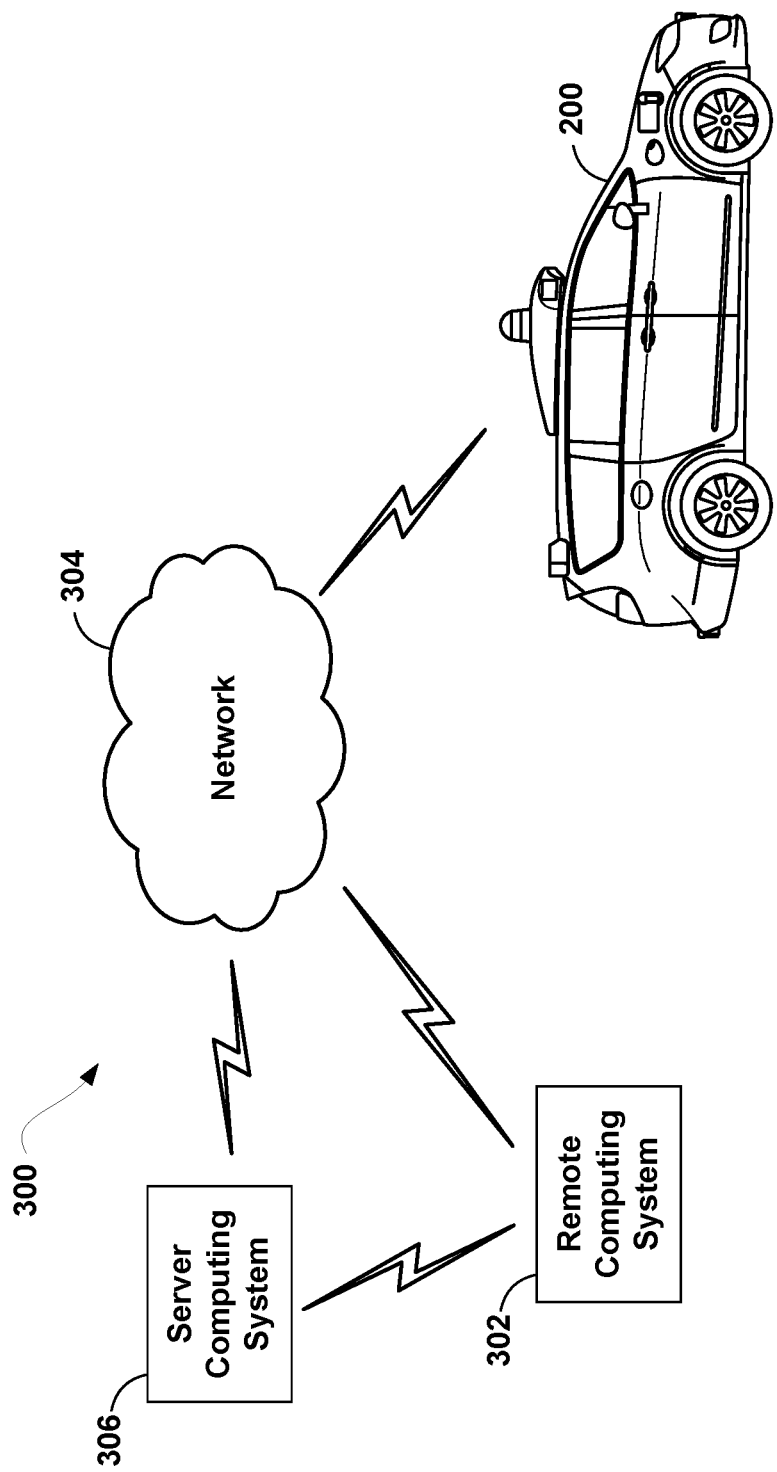
FIG. 3 is a conceptual illustration of wireless communication between various computing systems related to an autonomous vehicle.

FIG. 3 is a conceptual illustration of wireless communication between various computing systems related to an autonomous vehicle, according to an example implementation. In particular, wireless communication may occur between remote computing system 302 and vehicle 200 via network 304. Wireless communication may also occur between server computing system 306 and remote computing system 302, and between server computing system 306 and vehicle 200. During the operation of the vehicle 200, the vehicle may send and receive data from both the server computing system 306 and remote computing system 302 to aid in the operation of the vehicle 200. The vehicle 200 may communicate data related to its operation and data from its sensors to the server computing system 306 and the remote computing system 302. Additionally, the vehicle 200 may receive operational instructions and/or data related to objects sensed by the vehicle's sensors from the server computing system 306 and remote computing system 302.

Vehicle 200 can correspond to various types of vehicles capable of transporting passengers or objects between locations, and may take the form of any one or more of the vehicles discussed above.

Remote computing system 302 may represent any type of device related to remote assistance and operation techniques, including but not limited to those described herein. Within examples, remote computing system 302 may represent any type of device configured to (i) receive information related to vehicle 200, (ii) provide an interface through which a human operator or computer operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some implementations, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some implementations, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some implementations of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, or perhaps server computing system 306, or a computing system local to vehicle 200) may operate to use a camera to capture images of the environment of an autonomous vehicle. In general, at least one computing system will be able to analyze the images and possibly control the autonomous vehicle.

In some implementations, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives. In one example, a camera may be configured to capture still images and/or video. In some implementations, the vehicle may have more than one camera positioned in different orientations. Also, in some implementations, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that reflects off one or more objects near the vehicle. The radar unit may then capture electromagnetic signals that reflected off the objects. The captured reflected electromagnetic signals may enable the radar system (or processing system) to make various determinations about objects that reflected the electromagnetic signal. For example, the distance and position to various reflecting objects may be determined. In some implementations, the vehicle may have more than one radar in different orientations. The radar system may be configured to store captured information to a memory for later processing by a processing system of the vehicle. The information captured by the radar system may be environment data.

In another example, a laser range finder (e.g., LIDAR unit) may be configured to transmit an electromagnetic signal (e.g., light, such as that from a gas or diode laser, or other possible light source) that may reflect off one or more target objects near the vehicle. The laser range finder may be able to capture the reflected electromagnetic (e.g., laser) signals. The captured reflected electromagnetic signals may enable the range-finding system (or processing system) to determine a range to various objects, such as the objects that reflected the electromagnetic signals back to the laser range finder. The range-finding system may also be able to determine a velocity or speed of target objects and store it as environment data.

In some implementations, the processing system may be able to combine information from the various sensors in order to make further determinations of the environment of the vehicle. For example, the processing system may combine data from both radar information and a captured image to determine if another vehicle or pedestrian is in front of the autonomous vehicle. In other implementations, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle.

The vehicle may detect objects of the environment in various ways depending on the source of the environment data. In some implementations, the environment data may come from a camera and be image or video data. In other implementations, the environment data may come from a LIDAR unit. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

III. Example Systems and Methods

An example systems and methods of the present disclosure will now be described in more detail.

Figure 4A:
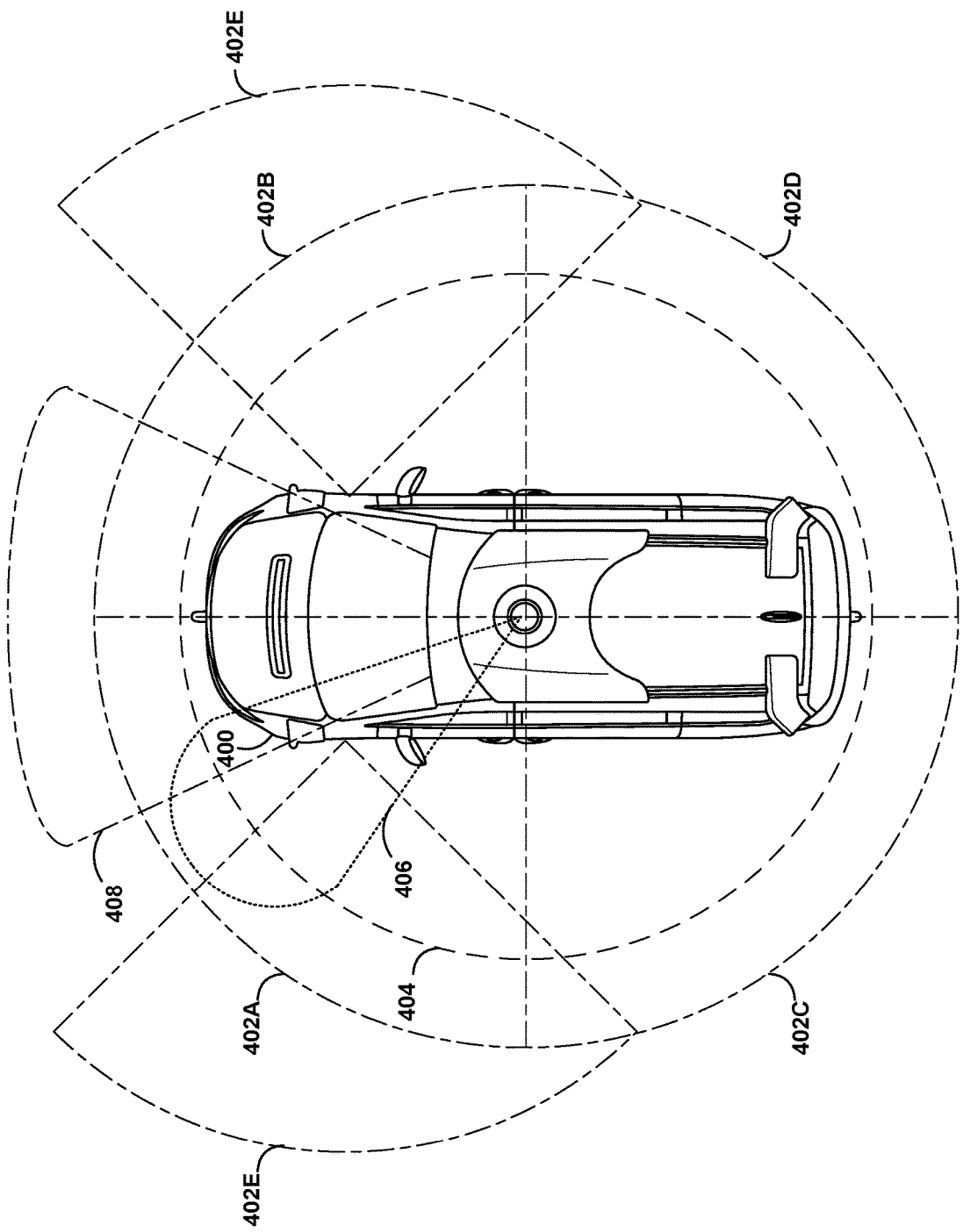
FIG. 4A illustrates an example autonomous vehicle having sensor fields of view.

FIG. 4A illustrates an example autonomous vehicle 400 having various sensor fields of view. As previously discussed with respect to FIG. 2, a vehicle 400 may contain a plurality of sensors. The locations of the various sensors may correspond to the locations of the sensors disclosed in FIG. 2. However, in some instances, the sensors may have other locations. Sensors locations are omitted from FIG. 4A for simplicity of the drawing. For each sensor unit of vehicle 400, FIG. 4A shows a respective field of view. The field of view of a sensor may include a angular region over which the sensor may detect objects and a range that corresponds to maximum distance from the sensor at which the sensor may reliable detect objects.

As previously disclosed, a vehicle 400 may include six radar units. A first radar unit may be located on the front-left of the vehicle and have an angular field of view corresponding to the angular portion of field of view 402A. A second radar unit may be located on the front-right of the vehicle and have an angular field of view corresponding to the angular portion of field of view. A third radar unit may be located on the rear-left of the vehicle and have an angular field of view corresponding to the angular portion of field of view 402C. A fourth radar unit may be located on the rear-right of the vehicle and have an angular field of view corresponding to the angular portion of field of view 402D. A fifth radar unit may be located on the left side of the vehicle and have an angular field of view corresponding to the angular portion of field of view 402E. A sixth radar unit may be located on the right side of the vehicle and have an angular field of view corresponding to the angular portion of field of view 402E. Each of the six radar units may be configured with a scannable beamwidth of 90 degrees. A radar beamwidth may be smaller than 90 degrees, but each radar unit may be able to steer the radar beam across the 90-degree field of view.

A first LIDAR unit of the vehicle 400 may be configured to scan the full 360-degree region around the vehicle as shown by an angular field of view corresponding to the angular portion of field of view 404. A second LIDAR unit of the vehicle 400 may be configured to scan the region smaller than the 360-degree region around the vehicle. In one example, the second LIDAR unit may have an 8-degree field of view in the horizontal plant as shown by an angular field of view corresponding to the angular portion of field of view 406.

Additionally, the vehicle may also include at least one camera. The camera may be an optical camera and/or an infrared camera. The camera may have an angular field of view corresponding to the angular portion of field of view 408.

In addition to the field of view for each of the various sensors of vehicle 400, each sensor may also have a corresponding range. In one example, the range of the radar units may be greater than the range of either LIDAR unit, as shown by the field of the views of the radar units 402A-402E extending further than the fields of view for the LIDAR units 404 and 406. Additionally, the second LIDAR unit may have a range that is greater than a range of the first LIDAR unit, as shown by field of view 406 extending further than field of view 406. The camera may have a range shown by the extent of the field of view 408. In various examples, the range of the camera may be greater than or less than the range of the other sensors.

Figure 4B:
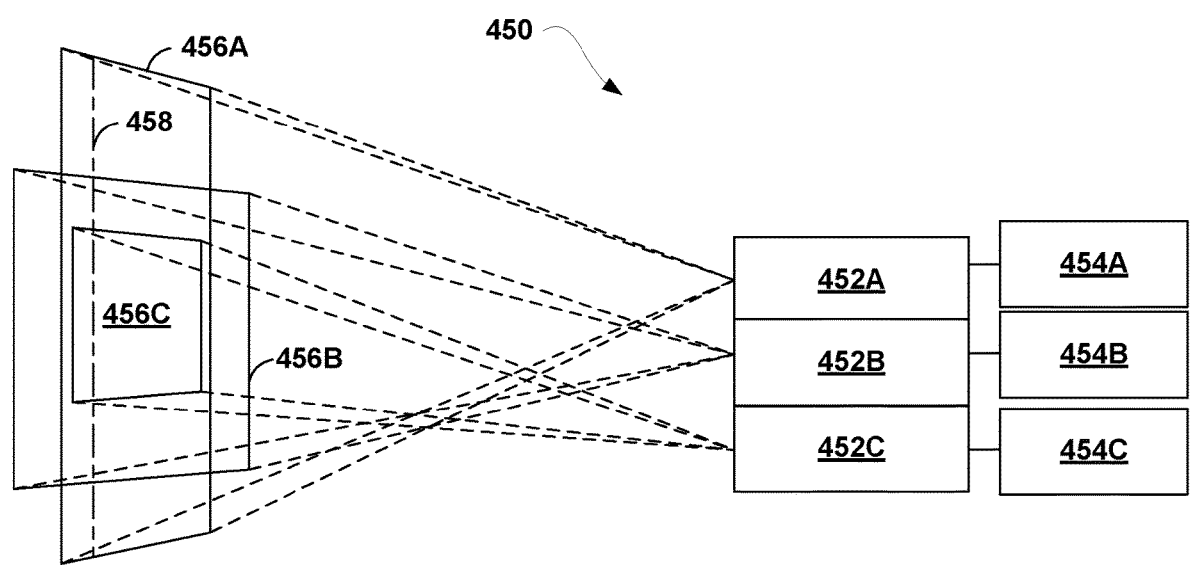
FIG. 4B illustrates example fields of view for various sensors.

FIG. 4B illustrates example fields of view for various sensors 452A-452C of a sensing system. Each sensor 452A-452C may be communicably coupled to a respective processing unit 454A-454C for the given sensor. Although the sensors are shown as generally being collocated with each other, the sensors may be located on different parts of the vehicle. The various sensors 452A-452C may be any of the sensors of the present disclosure that have a field of view. For example, various sensors 452A-452C may include LIDAR sensors, optical camera sensors, infrared camera sensors, and/or radar sensors. The respective location of the sensors may be the same as described with respect to FIG. 2. Further, although three sensors are shown, more (or fewer) sensors may also be used within the context of the present disclosure.

In this example, the three sensors 452A-452C have fields of view 456A-456C that are similar but not the same (e.g., overlapping fields of view). In other examples, the three sensors 452A-452C may have the same field of view (e.g., a common field of view). In still other examples, the three sensors 452A-452C may have entirely different (e.g., non-overlapping) fields of view.

The processing units 454A-454C may be configured to process data received by the sensors simultaneously, or near simultaneously. By routing the data created by the three sensors to different processing units, the data may be processed in parallel. Additionally, an output from the processing units 454A-454C may be communicated to the vehicle control system to aid in control of the vehicle. Thus, processed sensor data may be received at approximately the same time from the various sensors.

In some examples, the vehicle control system (or other processing unit of the vehicle) may be able to measure and/or determine a latency with respect to each sensor and processing unit. The vehicle control system may be able to adjust the received data in order to synchronize the various sensors with one another. The present systems and methods may assist in vehicle control system in determining the sensor and/or processor latency. In one example, sensor 452A may be a LIDAR sensor. During the operation of the LIDAR sensor 452A, the LIDAR sensor 452A may transmit a line of laser pulses 458. The LIDAR sensor 452A may iteratively transmit the line of laser pulses 458 across the field of view 456A of the LIDAR sensor 452A. The LIDAR sensor may receive reflections from objects that reflect the laser pulses 458. In some other examples, the lasers pulses 458 may not be a line of pulses, but may be one or more laser point pulses. The LIDAR sensor 452A may convert the received LIDAR reflections into an electrical signal for processing by the LIDAR processor 454A.

Within this example, sensor 452B may be a radar sensor. The sensor 452A may transmit a radar signal over a field of view 456B and receive radar pulses back. The radar sensor 452B may convert the received radar reflections into an electrical signal for processing by the radar processor 454B. Additionally, within this example, sensor 452C may be a camera sensor (either an optical camera, an infrared camera, or both). The camera sensor 452B may convert received light from its field of view 456C into an electrical signal for processing by the camera processor 454C.

In various examples, the type of sensors, the placement of sensors, and the sizes of the fields of view of the sensors may be different than that shown in FIG. 4B.

Figure 5A:
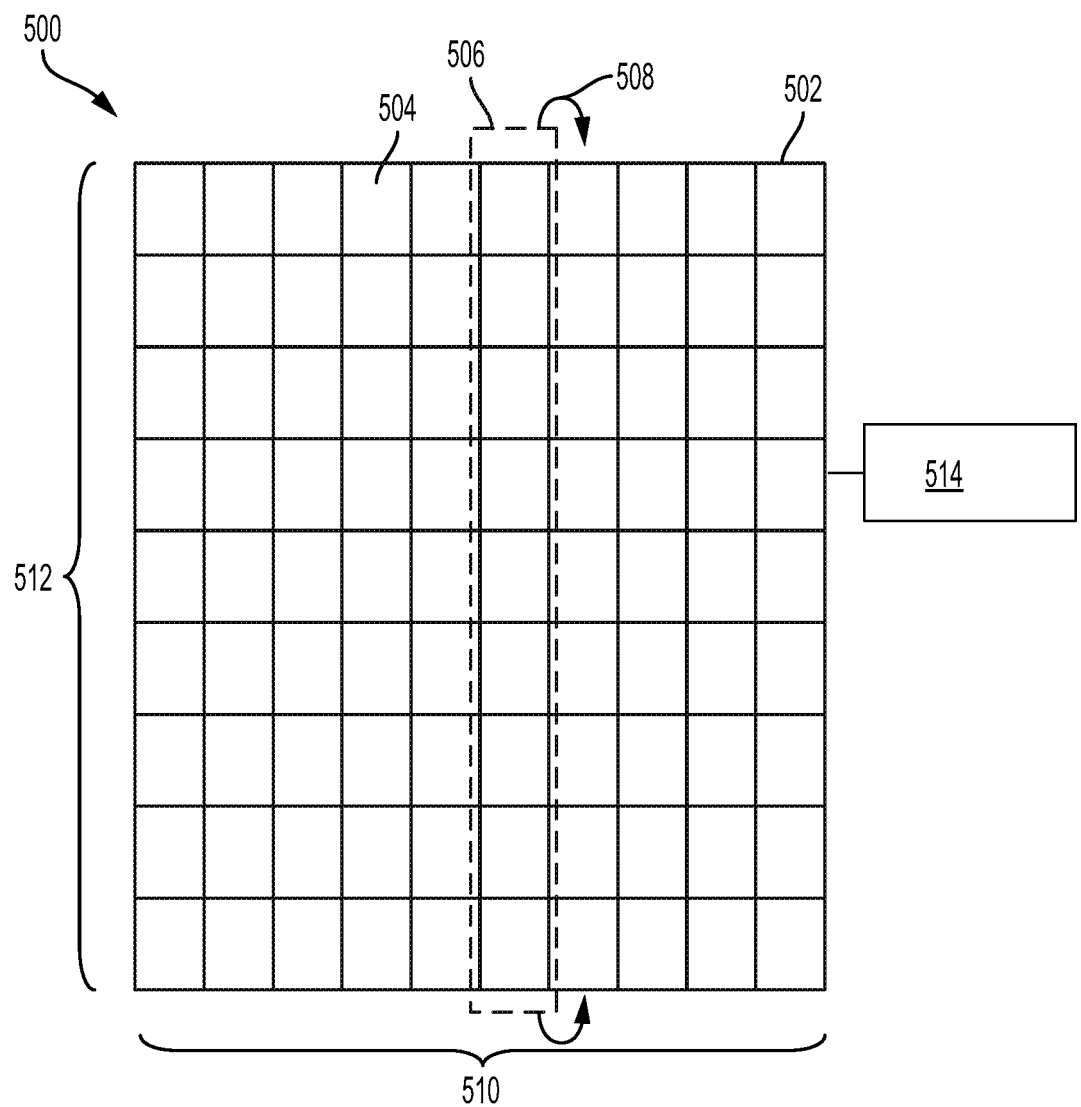
FIG. 5A illustrates an example target.

FIG. 5A illustrates an example target 500. The target 500 comprises a plurality of cells 504 arranged in a grid 502. Although the grid 502 is shown as a uniform grid (i.e., cells in rows and columns), in some examples the grid 502 may not be uniform. Each cell 504 of the grid 502 may include at least one of a light detector, a light emitting diode (LED), and/or an IR element (e.g., an element that produces heat visible to an IR sensor). In some examples, the LED and/or IR element may be called a light source. In one example, the IR element may be a Micro-Electro-Mechanical System (MEMS) IR source elements using amorphous-Carbon Nano Coating (a-CNC) films. The a-CNC film may enable the IR element to have a long life and also have a quick pulse functionality. The quick pulse functionality may mean that IR is emitted from the IR element more quickly in response to a signal being applied to emit the IR.

The grid 502 may be a two-dimensional grid having a height 512 and a width 510. The grid 502 may be coupled to a processor 514 that executes instructions to control the operation of the target 500.

During operation of the target 500, at least one cell 504, such as a cell on the left edge of the grid, may contain a light sensor. The light sensor may be configured to create an electrical signal in response to a LIDAR laser pulse striking the light sensor. During operation of the target 500, a LIDAR unit of a vehicle (or other apparatus) may scan a LIDAR beam across the target 500 when the target is within a field of view of the LIDAR unit. The LIDAR beam may be transmitted as a series of pulses. In some examples, the LIDAR beam may be scanned across the field of view of the LIDAR unit. As the LIDAR beam scans across the field of view of the LIDAR unit, the LIDAR beam 506 may strike a plurality of cells at once. As the LIDAR beam 506 scans across the field of view, it may sequentially 508 strike the cells 504 of the grid 502. Thus, the LIDAR beam 506 may strike a cell 504 of the grid 502 that contains a light sensor.

In another example, a plurality of cells may contain light sensors, such as several cells on a left edge of the grid 502. In another example, the grid 502 may have a plurality of cells 504 that contain light sensors. By including a plurality of light sensors, the target 500 may increase the chances by which it receives a LIDAR pulse. In yet a further example, the light sensor may be located outside of the grid 502. Additionally, the light sensor may include a lens. The lens may enable the light sensor to detect LIDAR pulses over a wider region that if the light sensor did not include the lens.

In response to one (or more) of the light sensors sensing a LIDAR pulse, the respective sensor that senses the pulse may communicate an electrical signal to the processor 514. The processor 514 may be able to determine which light sensor detected the LIDAR pulse (in instances where there is more than one light detector) and where on the grid 502 the light sensor is located.

In response to detecting the LIDAR pulse, the processor 514 may selectively illuminate a plurality of light sources (e.g., LED and/or IR source) each within a cell 504 of the grid 502. In some examples, the light source may be an LED or an IR element. In other examples, each cell may contain both an LED and IR element. In yet further examples, a single light source may both emit visible light as well as IR light.

The processor 514 may illuminate the plurality of light sources in a predetermined pattern. The predetermined pattern may be based on a location of the light sensor. The predetermined pattern may correspond to a location of the LIDAR pulse. For example, the processor may be configured to illuminate light sources of the grid 502 at the same time (or approximately the same time) as when the LIDAR pulses strike a respective cell 504 of the grid. Thus, the processor 514 may coordinate an illumination of the light sources with a timing of the LIDAR pulse.

In some further examples, the grid 502 may be calibrated to determine a timing for the processor's operation. As part of the calibration, the delay between providing a voltage to a light source and time at which the light source is detected may be calculated. For example, an LED may have a finite amount of time from when a voltage is applied to the light source to when it begins to output light. Similarly, an IR element may have a finite amount of time from when a voltage is applied to the IR element to when it begins to output light. The processor may be able to account for the light source delay when it triggers the respective light sources.

Figure 5B:
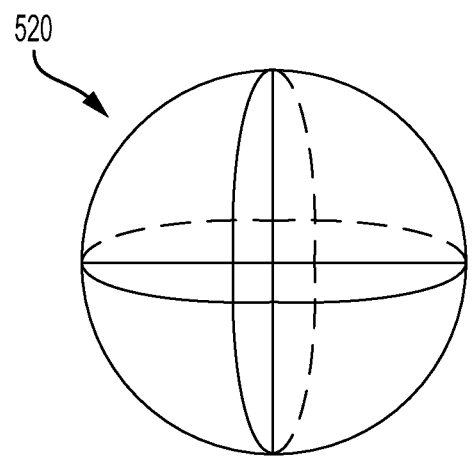
FIG. 5B illustrates an example target.

FIG. 5B illustrates an example target 520. The target 520 may be a retroreflector as shown in FIG. 5B. In other examples, the target 520 may be another shape or form of reflector. The target 520 may be a target that is configured to reflect electromagnetic signals that impinge on the target 520 back in the direction from which the electromagnetic signals came. Thus, if a radar unit of a vehicle emits a radar signal in the direction of the target 520, the target 520 will reflect a portion of the radar signal back to vehicle.

The target may reflect a percentage of the electromagnetic energy based on the size of the target 520. The target may be configured to have a high radar cross section (RCS), that is the target may be configured to be highly reflective to radar signals in the direction in which the radar signals were transmitted. In some examples, a computing system of a vehicle may know the RCS of the target 520 and use the known RCS to calibrate and/or validate the radar unit of the vehicle.

Figure 5C:
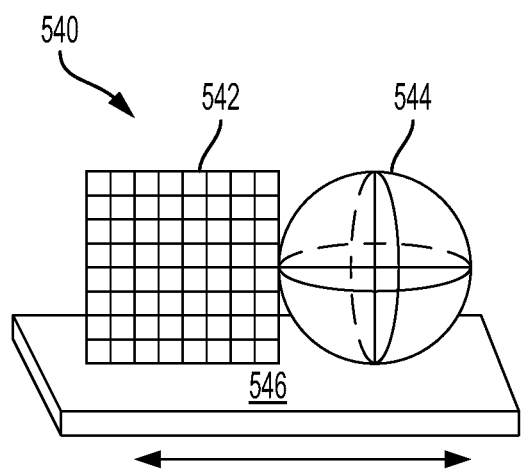
FIG. 5C illustrates an example targeting system.

FIG. 5C illustrates an example targeting system 540. The targeting system 540 may include a first target 542 and a second target 544. The first target 542 may be similar or the same as target 500 of FIG. 5A. The second target 544 may be the same or similar to target 520 of FIG. 5B. The two targets may be mounted on a moveable platform 546.

The processor 514 of FIG. 5A, or another processor (not shown) may be configured to move the platform 546 that contains the two targets 542 and 544. The platform 546 may be moved with a predetermined motion by the processor. The processor may be configured to move the platform 546 throughout a region near a vehicle. By moving the platform 546 various positions and trackings of the two targets 542 and 544 may be received by a vehicle processing system that images the targets.

In some further examples, the components of target 500 may be included on target 520 as a hybrid target. This hybrid target may be a singular target that includes the radar reflection features of target 520 and the light sensors and light sources in a grid arrangement like target 500. Thus, in these examples, the platform 546 may only include one target which is configured to perform the functions of targets 542 and 544.

Figure 6:
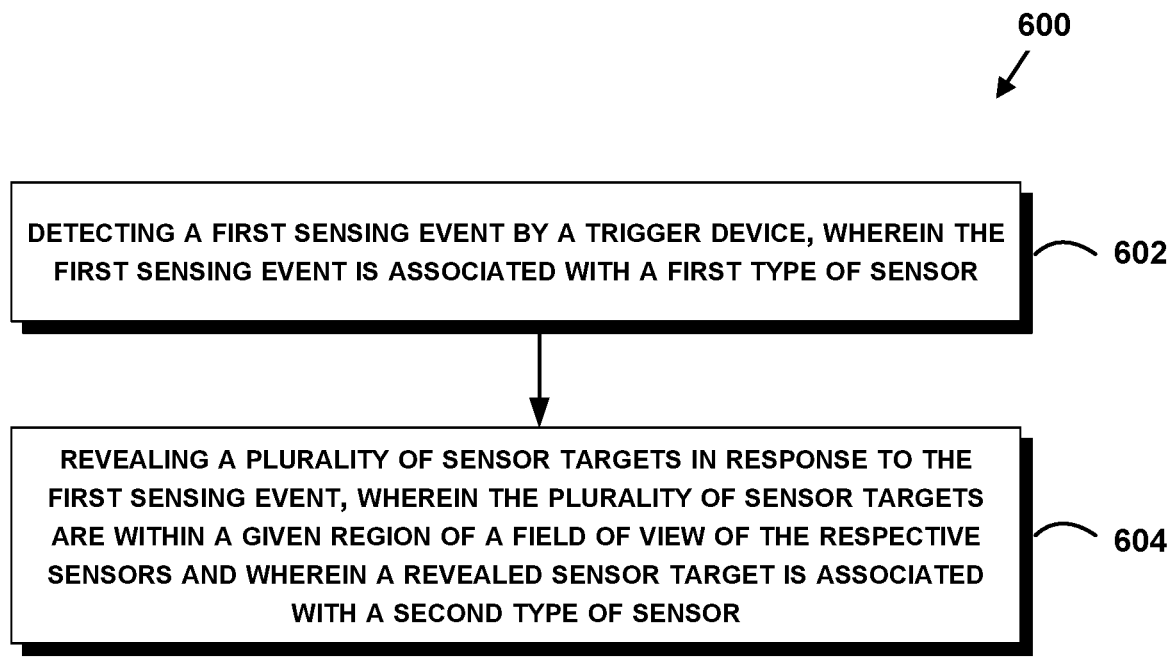
FIG. 6 illustrates an example method.
Figure 7:
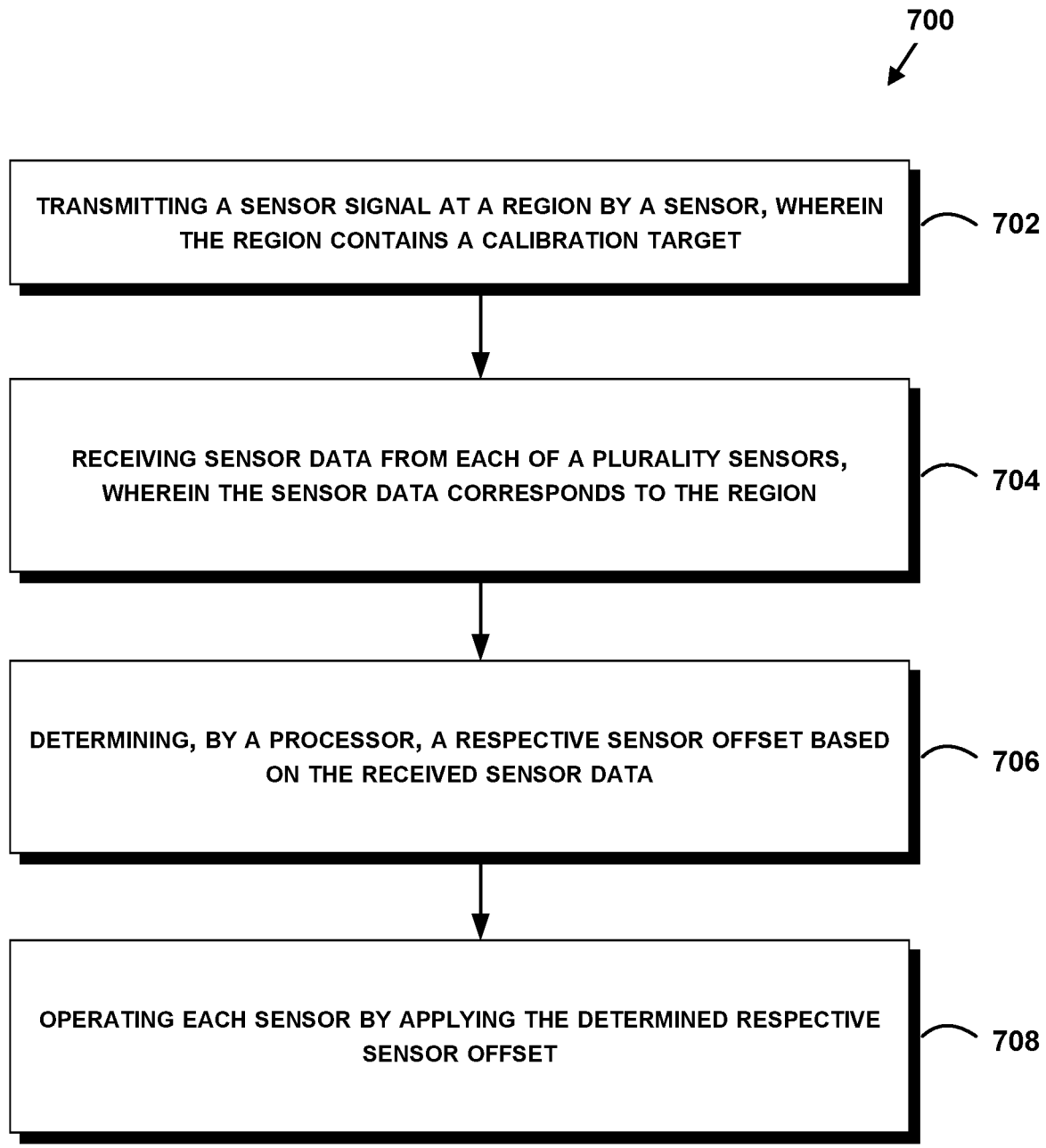
FIG. 7 illustrates an example method.

FIG. 6 is a flowchart of a method 600, according to an example embodiment. Additionally, FIG. 7 is a flowchart of a method 700, according to an example embodiment. Method 600 shown in FIG. 6 and method 700 shown in FIG. 7 each present an embodiment of a method that could be used with any of the vehicles 100, 200, 400, and/or the targets 500, 520, and 540, for example. Method 600 may include one or more operations, functions, or actions as illustrated by one or more of blocks 602-604. Method 700 may include one or more operations, functions, or actions as illustrated by one or more of blocks 702-708. Although the blocks of each method are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 600, the method 700, and other processes and methods disclosed herein, the flowcharts show functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Additionally or alternatively, for the method 600, the method 700, and other processes and methods disclosed herein, one or more blocks in the flowchart may represent circuitry that is wired to perform the specific logical functions in the process.

In some examples, for the method 600, the method 700, and other processes and methods disclosed herein, the functions described in the flowchart may be performed by a single vehicle (e.g., vehicle 100, 200, etc.), distributed between multiple vehicles, performed by a remote server/external computing system (e.g., system 302 and 306), and/or performed by a combination of one or more external computing systems and one or more vehicles, among other possibilities.

At block 602, method 600 involves detecting a first sensing event by a trigger device, wherein the first sensing event is associated with a first type of sensor. The trigger device may be light sensor configured to detect a LIDAR pulse. In some examples, there may be more than one light sensor on a given target. Additionally, in some examples, the light sensors may include a lens to help the light sensor receive the LIDAR pulse. The trigger device may be configured to output an electrical signal in response to the trigger condition being met.

In some examples, the light sensor(s) may be coupled to a processor. In response to the light sensor receiving a LIDAR pulse, the light sensor may output a signal to the processor indicating that a LIDAR pulse has been received. Additionally, the light sensor(s) may be located on a grid that include a plurality of light sources along with the light sensor.

At block 604, method 600 involves revealing at least one of plurality of sensor targets in response to the first sensing event, where the plurality of sensor targets are within a given region of a field of view of the respective sensors and wherein a revealed sensor target is associated with a second type of sensor. As previously discussed, a vehicle sensor system may include a plurality of sensors each sensor having a respective field of view. It may be desirable for method 600 to reveal at least one of a plurality of sensor targets in response to the light sensor detecting the LIDAR pulse. By having the plurality of sensor targets within a given region of a field of view of the respective sensors, a target may include portions that are detectable by various sensors of the vehicle. In some examples, a target may be configured to provide portions that may be detected by a LIDAR unit, a radar unit, an optical camera, and an IR camera.

In some examples, revealing at least one of plurality of sensor targets may include a processor receiving the signal that indicates a LIDAR pulse struck the light sensor and responsively illuminating light sources. The processor may be able to determine which light sensor detected the LIDAR pulse (in instances where there is more than one light detector) and where on the grid the light sensor is located. In other examples, the processor may be programmed to know the location of the light sensor with respect to the location of the grid of light sources.

As previously discussed, in response to detecting the LIDAR pulse, the processor may selectively illuminate a plurality of light sources (e.g., LED and/or IR source) each within a cell of the grid. In some examples, the light source may be an LED or an IR element. In other examples, each cell may contain both an LED and IR element. In yet further examples, a single light source may both emit visible light as well as IR light.

The processor may illuminate the plurality of light sources in a predetermined pattern. The predetermined pattern may be based on a location of the light sensor. The predetermined pattern may correspond to a location of the LIDAR pulse. For example, the processor may be configured to illuminate light sources of the grid at the same time (or approximately the same time) as when the LIDAR pulses strike a respective cell of the grid. Thus, the processor may coordinate an illumination of the light sources with a timing of the LIDAR pulse.

In some further examples, the grid may be calibrated to determine a timing for the processor's operation. As part of the calibration, the delay between proving a voltage to a light source and the time at which the light source may be detected may be calculated. For example, an LED may have a finite amount of time from when a voltage is applied to the light source to when it begins to output light. Similarly, an IR element may have a finite amount of time from when a voltage is applied to the IR element to when it begins to output light. The processor may be able to account for the light source delay when it triggers the respective light sources.

Additionally, in some further examples, the processor may also know a processing delay associated with the sensors of a vehicle. The processing delay may include the amount of time from when a signal is received by a given sensor to when a processor associated with a given sensor provides an output signal based on the detection. In some examples, the processor of the target may reveal the targets based on a processing delay of the sensors of the vehicle. In other examples, the processor may reveal the sensor target at approximately the same time the LIDAR pulse strikes the target. By revealing the sensor at approximately the same time, a processing unit of the vehicle may be able to determine processing and sensing delays for the various sensors of the vehicle.

The revealing of at least one of a plurality of sensor targets may also include moving a platform on which the sensor targets are located. In one example, the light sensor, grid of light sources and a radar target may be mounted on a movable platform. The platform may be moved in a manner to allow the sensor units of the vehicle to receive data from the various sensors based on a location of the target.

At block 702, method 700 involves transmitting a sensor signal at a region by a sensor, wherein the region contains a calibration target. At block 702, the sensor of a vehicle may be configured to transmit sensor signals. The sensor signals may include LIDAR signals from one or more LIDAR units and one or more radar signals from one or more radar units. For LIDAR and radar sensors, the sensors transmit signals and receive reflections of the signals from the environment of a field of view of the sensor.

In some examples, one LIDAR unit may be configured to transmit LIDAR pulses in an iterative manner in the full 360-degree region around a vehicle. The second LIDAR unit may be able to steer and aim at a given region of the environment around a vehicle. The radar units may each be configured to transmit and receive radar signals over a 90-degree region around the vehicle. The transmitting at block 702 may also include transmitting the sensor signals in a region that includes the sensor target disclosed herein.

At block 704, method 700 involves receiving sensor data from each of a plurality sensors, wherein the sensor data corresponds to the region. As previously discussed, the vehicle may include a plurality of sensors, each having a respective field of view, including an angular field of view and a range. Sensor data may be received by one or more LIDAR units, each comprising one or more LIDAR sensors, one or more radar units, each comprising one or more radar sensors, and one or more camera units, each comprising one or more camera sensors. The LIDAR and radar units may be configured to receive data based on reflected LIDAR and radar signals transmitted at block 702. The camera sensors may be able to receive visible and/or infrared light and convert the light to data.

Each sensor may be configured to receive data within a field of view of the respective sensor. In some examples, a sensor target as described throughout this application may be present in the field of view of the sensors of the vehicle. At block 704, the vehicle may receive data that corresponds to detections of the target. The target may be located within the field of view for one or more of the sensors. In some examples, it may be desirable for the target to be located within the field of view for at least one of each type of sensor (e.g., LIDAR, radar, optical camera, and IR camera) at the same time.

As previously discussed, when the target senses an LIDAR pulse with a light sensor, the target may responsively illuminate one more light sources. In some examples, the target may illuminate the light sources that correspond to the location of the LIDAR pulse. The LIDAR unit may receive reflections of the LIDAR pulses from the target at the same time (or approximately the same time) as the radar unit receives radar reflections from the target and the cameras receive light from the light sources. Because of the coordination of these events, a processing system of the vehicle may be able to determine various offsets (both timing and spatial) of the various sensors of the vehicle. The timing offsets may account for a processing time of the various received signals. The spatial offsets may account for the alignment of the various sensors. Additionally, in some examples, the target may move.

Block 704 may also include continuously or periodically receiving additional data from the various sensors that correspond to the target. Thus, the moving target may enable the vehicle to make sensor offset measurements that simulate and/or correspond to a vehicle in motion. Both the pattern of light sources turning on and off and the motion of the target may induce a shutter distortion in the camera. As previously discussed, because a camera may include a rolling shutter (i.e., sample cells of the camera sensor in an iterative manner) objects that are moving quickly may appear skewed in the image produced by the camera sensor. Therefore, the present system and methods may help measure and correct for camera rolling shutter errors.

At block 706, method 700 involves determining, by a processor, a respective sensor offset based on the received sensor data. In some examples, a processor of the vehicle may be configured to receive processed sensor data from the various sensors of the vehicle. As part of a calibration routine, the processor may be able to determine various offsets (like the timing and spatial offsets previously described). The processor may be able to correlate sensor data received by the various sensors at block 704. Based on knowing the shape and layout of the target, the processor may be able to determine what the received data should look like. That is, the processor may be able to determine which data from the sensors is misaligned in time or space. Based on this correlation, the processor may be able to determine various offsets in both time and space for a given sensor.

Further, the processor may also be able to determine a camera-sampling offset for the camera to reduce skew caused by the rolling shutter.

At block 708, method 700 involves operating each sensor by applying the determined respective sensor offset. By applying the offsets determined at block 706, each sensor may have a time and/or spatial offset applied. When the offsets are applied, the various sensors may by synchronized in both time and space. By having the sensors synchronized, objected detected by one sensor at a given time and place should have a similar detection at the same time and place if visible by another sensor. The offsets may increase the accuracy of the sensing system as a whole. Further, block 708 may also include performing a sensor validation on the sensors having the applied offset. The validation may include performing blocks 702 and 704 with sensors having the offsets applied. The validation may enable the system to check that the sensors are performing in a synchronized manner.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A calibration system for an autonomous vehicle, the calibration system comprising:
    a trigger device configured to detect electromagnetic energy provided by a vehicle sensor;
    a plurality of light sources arranged in a grid;
    a processor configured to:
        receive a first signal that indicates the trigger device detected a first pulse of electromagnetic energy provided by the vehicle sensor;
        based on receiving the first signal, illuminate a first set of light sources from the plurality of light sources arranged in the grid;
        receive a second signal that indicates the trigger device detected a second pulse of electromagnetic energy provided by the vehicle sensor, wherein the second pulse of electromagnetic energy is detected subsequent to the first pulse of electromagnetic energy a; and
        based on receiving the second signal, illuminate a second set of light sources from the plurality of light sources arranged in the grind, wherein the first set of light sources and the second set of light sources depend on a predefined pattern.

2. The calibration system of claim 1, further comprising:
    a platform, wherein the trigger device, the plurality of light sources arranged in the grid, and the processor are located on the platform, and
    wherein the processor is further configured to cause the platform to move according to a predetermined motion.

3. The calibration system of claim 2, further comprising:
    a plurality of sensor targets coupled to the platform, wherein the plurality of sensor targets comprise at least one from the group consisting of a LIDAR target, a camera target, an infrared target, a thermal infrared target, and a radar target.

4. The calibration system of claim 3, wherein the processor is further configured to reveal the plurality of sensor targets based on a sensor offset for each of the plurality of sensor targets.

5. The calibration system of claim 4, wherein the processor is further configured to reveal the plurality of sensor targets based on a propagation delay for each of the plurality of sensor targets.

6. The calibration system of claim 1, wherein the trigger device is a light sensor.

7. The calibration system of claim 6, wherein the first detection of electromagnetic energy is a first laser pulse striking the light sensor and the second detection of electromagnetic energy is a second laser pulse striking the light sensor.

8. The calibration system of claim 1, wherein the trigger device comprises a light sensor and a lens, and
    wherein the trigger device is arranged in the grid.

9. The calibration system of claim 1, wherein the grid further comprises:
    a plurality of cells arranged in two dimensions, wherein each cell includes a light source from the plurality of light sources and an infrared (IR) source.

10. The calibration system of claim 9, wherein the IR source comprises:
    a Micro-Electro-Mechanical System (MEMS) IR source.

11. The calibration system of claim 1, wherein the trigger device is a first trigger device located at a first position in the grid and wherein the calibration system further comprises:
    a second trigger device located at a second position in the grid.

12. The calibration system of claim 1, wherein each light source from the plurality of light sources is configured to emit visible light and infrared (IR) light.

13. A method for calibrating a plurality of sensors of an autonomous vehicle, the method comprising:
    receiving, at a computing device, a first signal indicating that a trigger device detected a first pulse of electromagnetic energy provided by a vehicle sensor;
    based on receiving the first signal, illuminating a first set of light sources from a plurality of light sources arranged in a grid;
    receiving, at the computing device, a second signal indicating that a trigger device detected a second pulse of electromagnetic energy provided by the vehicle sensor, wherein the second pulse of electromagnetic energy is detected subsequent to the first pulse of electromagnetic energy; and
    based on receiving the second signal, illuminating a second set of light sources from the plurality of light sources arranged in the grid,
    wherein the first set of light sources and the second set of light sources depend on a predefined pattern.

14. The method of claim 13, further comprising:
    causing a platform to move according to a predetermined motion, wherein the trigger device, the computing device, and the plurality of light sources arranged in the grid are coupled to the platform.

15. The method of claim 14, further comprising:
    revealing at least one of a plurality of sensor targets based on receiving the first signal, wherein the plurality of sensor targets is coupled to the platform and comprise a LIDAR target, a camera target, an infrared target, and a radar target.

16. The method of claim 15, further comprising:
    revealing the plurality of sensor targets based on a sensor offset for each of the plurality of sensor targets.

17. The method of claim 16, further comprising:
    revealing the plurality of sensor targets based on a delay for each of the plurality of sensor targets.

18. The method of claim 13, wherein receiving the first signal indicating the trigger device detected the first pulse of electromagnetic energy provided by the vehicle sensor comprises:
    receiving the first signal based on a first laser pulse striking a light sensor; and
    wherein receiving the second signal indicating the trigger device detected the second pulse of electromagnetic energy provided by the vehicle sensor comprises:
    receiving the second signal based on a second laser pulse striking the light sensor.

19. The method of claim 13, wherein receiving the first signal indicating that the trigger device detected the first pulse of electromagnetic energy comprises:
    receiving the first signal from a first light sensor corresponding to the trigger device; and
    wherein receiving the second signal indicating that the trigger device detected the second detection of electromagnetic energy comprises:
    receiving the second signal from a second light sensor corresponding to the trigger device.

20. A non-transitory computer-readable medium configured to store instructions, that when executed by a computing system comprising one or more processors, causes the computing system to perform operations for calibrating sensors of an autonomous vehicle, the operations comprising:
    receiving a first signal indicating that a trigger device detected a first pulse of electromagnetic energy provided by a vehicle sensor;
    based on receiving the first signal, illuminating a first set of light sources from a plurality of light sources arranged in a grid;
    receiving a second signal indicating that the trigger device detected a second pulse of electromagnetic energy provided by the vehicle sensor, wherein the second pulse of electromagnetic energy is detected subsequent to the first pulse of electromagnetic energy; and
    based on receiving the second signal, illuminating a second set of light sources from the plurality of light sources arranged in the grid,
    wherein the first set of light sources and the second set of light sources depend on a predefined pattern.

* * * * *